United States Patent [19]

Blair

[11] 4,155,086

[45] May 15, 1979

[54] CLUTTERLOCK WITH DISPLACED PHASE ANTENNA

[75] Inventor: Lloyd R. Blair, Phoenix, Ariz.

[73] Assignee: Goodyear Aerospace Corporation, Akron, Ohio

[21] Appl. No.: 491,493

[22] Filed: Sep. 14, 1965

[51] Int. Cl.² .............................................. G01S 9/02
[52] U.S. Cl. .................... 343/7 A; 343/5 CM; 343/7.4
[58] Field of Search .................... 343/7 A, 8, 9, 16 M, 343/5 ST, 100 SA, 7.4, 5 CM

[56] References Cited

U.S. PATENT DOCUMENTS 3,115,626  12/1963  Raabe .................................. 343/8 X
4,034,370  7/1977  Mims .................................. 343/5 CM Primary Examiner—T. H. Tubbesing
Attorney, Agent, or Firm—P. E. Milliken; E. W. Oldham; R. L. Weber

[57] ABSTRACT

This invention relates to a clutterlock with displaced phase antenna, and more particularly to a means to provide a control signal generated from radar signals which may be used to maintain alignment between the physical and synthetic beams of a coherent doppler aperture radar or to maintain alignment between the antenna and the direction of cancellation of fixed scatterers of an airborne-doppler-moving-target-indication radar.

6 Claims, 8 Drawing Figures

INVENTOR
LLOYD R. BLAIR

CLUTTERLOCK WITH DISPLACED PHASE ANTENNA

GENERAL

This invention relates to a clutterclock with displaced phase antenna, and more particularly to a means to provide a control signal generated from radar signals which may be used to maintain alignment between the physical and synthetic beams of a coherent doppler aperture radar or to maintain alignment between the antenna and the direction of cancellation of fixed scatterers of an airborne-coherent-doppler-moving-target-indication radar.

The requirements of the coherent-doppler-synthetic-aperture radar and the coherent-doppler-moving-target-indication radar are similar. Both must take into account the orientation and variations in the orientation of the antenna with respect to the instantaneous direction of the radar flight path. Also, each must take into account displacements of the radar flight path from an average straight line flight path, in which the averaging distance is equal to or longer than the distance travelled by the radar along the flight path during the integration time of the radar. Thus, there are two problems:
1. The physical antenna must be accurately aligned with respect to a straight line flight path.
2. The displacements from a straight line flight path during the radar integration time must be compensated, if excessive.

CLUTTERLOCK CHARACTERISTICS

The solution to these problems employed in this invention makes use of a device known as a clutterlock, sometimes called a beam-steerer. The clutterlock determines by processing the radar return signals, the polarity of the component of aircraft velocity in the direction of the antenna beam. Hereafter, the component of aircraft velocity in the direction of the antenna beam will be called "along-the-beam velocity." In addition to determining polarity of along-the-beam velocity, the clutterlock output signal amplitude varies linearly with along-the-beam velocity for the range of velocities near zero.

Thus, the clutterlock detects misalignment between the aircraft flight path and the antenna. This is tantamount to detecting misalignment between the physical and synthetic beams of a coherent doppler side-locking radar, or detecting misalignment between the physical antenna and the direction of cancellation of an airborne-coherent-doppler-moving-target-indication radar.

In application, the radar return signals may be altered by phase or frequency shifts to resemble signals from a deviated or synthetic flight path. In this case, the clutterlock detects misalignment between the antenna and the synthetic flight path.

Also, in application, the clutterlock may be biased to determine the polarity of along-the-beam velocity about a velocity other than zero.

The clutterlock signals may be used to:
1. steer the physical antenna so that it remains aligned with an actual or synthetic flight path.
2. provide phase of frequency shifts to the radar return signals to form a synthetic flight path that is aligned with the physical antenna.

Heretofore, a clutterlock using a single channel antenna has been utilized to produce the antenna alignment or flight path correction error signal. This error signal fluctuates about zero even when the synthetic and physical beams are aligned. This fluctuating error signal is caused by scintillation of complex scatterers and also uneven distributions of scatterers on the ground. Scatterers in effect are targets of complex geometric or random shapes. Scatters are objects in the radar beam that cause some of the radar energy to be reflected and returned to the antenna. For this reason, the output of the single channel clutterlock must be filtered or "smoothed" for a considerable period of time before the signal is useful, and this leads to a slow reaction time and inaccuracy.

Therefore, it is the general object of the present invention to avoid and overcome the foregoing and other difficulties of prior art practices and meet the needs of the art by providing a clutterlock with a displaced phase center antenna which requires very little smoothing of return signals to indicate the zero doppler relationship, and therefore has a much faster reaction time.

Another object of the invention is to generate an error signal from return radar signals of a doppler beam-sharpening radar, which error signal may be used to aid the navigation system of the vehicle to align the radiated beams of the radar in a particular relation to the flight path of the vehicle.

A further object of the invention is to provide a clutterlock with displaced phase center antennas to generate error signals in a short period of time and with increased accuracy because the effects of scintillation of complex scatterers and uneven distributions of scatterers on the ground are virtually eliminated.

A further object of the invention is to provide a clutterlock with displaced phase antennas wherein a transmitted signal is transmitted simultaneously from the antennas, but received separately and compared to produce an error signal indicating displacement of the antennas with respect to the flight path of the aircraft.

The aforesaid objects of the invention and other objects which will become apparent as the description proceeds are achieved by providing in an apparatus to maintain proper alignment of a coherent doppler-synthetic aperture radar along the flight path of an aircraft the combination of a pair of antennas mounted to the aircraft in end-to-end relationship substantially in alignment with the flight path of the aircraft, means to simultaneously transmit a pulse from both antennas whereby the pulse appears to come from a transmission phase center approximately midway between the antennas, a reception phase center on each antenna adapted to separately receive reflections of the transmitted pulse, means to compare the return signals with the flight path velocity of the aircraft, the repetition of pulse transmissions, and the distance between the transmission phase center and the reception phase centers to determine an error signal indicating if the antennas are not in alignment with the flight path of the aircraft, and means in effect to adjust the alignment of the antennas in accordance with the error signals to obtain coincident alignment of the antenna with the flight path of the aircraft, or alternatively the error signals may be used to alter the phase of the return signals to compensate for flight path errors.

For a better understanding of the invention reference should be had to the accompanying drawings, wherein:

FIGS. 1-A, 1-B, and 1-C are diagrammatic illustrations of the geometry of the beam-steering and motion compensation problems;

Although the principles of the invention are broadly applicable to any radar system on any moving vehicle, it is to be particularly understood that the invention is usually applied to a coherent doppler radar on an aircraft which utilizes the zero doppler plane normal to the flight path of an aircraft, and hence it has been so illustrated and will be so described.

In many applications of a doppler synthetic aperture radar, it is necessary to use a radar beam steering technique for stabilizing the physical beam to the average velocity vector of the vehicle. Prior art beam steering has provided antenna stabilization in azimuth by determining the sense of pulse-to-pulse phase shift of the far range signals. Pitch stabilization can be obtained in a like manner, but using near range signals. This operation requires that the direction of rotation of the phases of the return signals be determined; therefore, the operations must be made using a carrier or else both in-phase and quadrature signals are needed. These difficult, slow and generally somewhat inaccurate prior art systems are improved upon by the concept described below.

BASIC PRINCIPLE

Figure 1A:
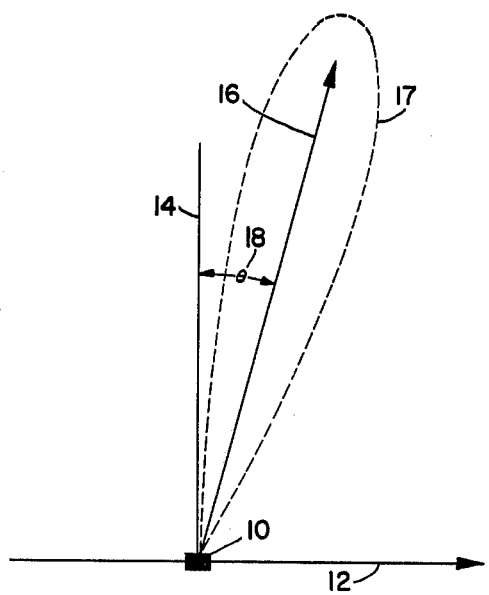
Figure 1B:
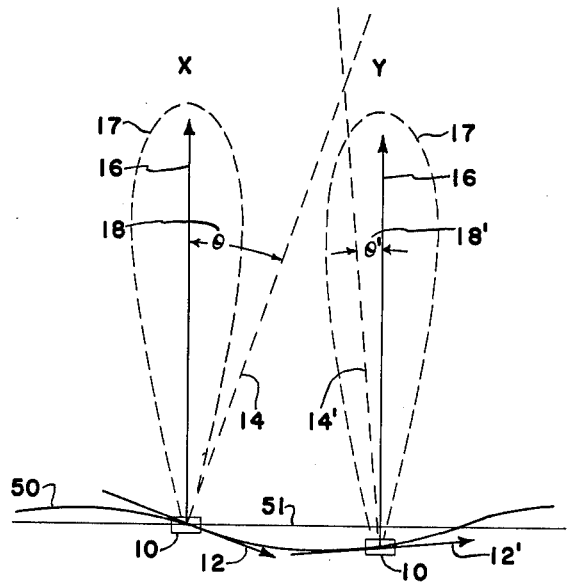
Figure 1C:
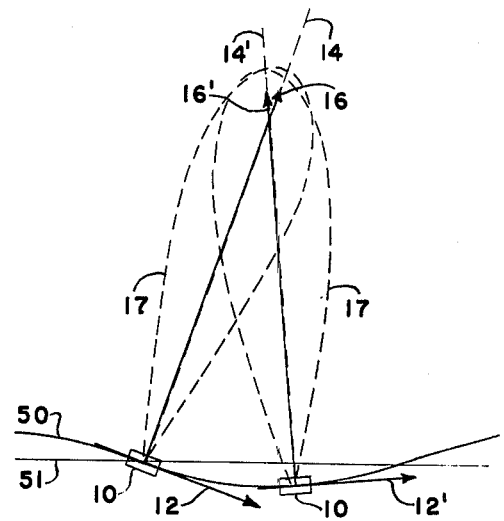

The basic principle upon which clutterlocks depend is simple, and can be understood with reference to FIG. 1-A which shows a side-looking radar 10 mounted on a vehicle (not shown) that is moving horizontally over the earth's surface at a constant velocity in a direction indicated by the arrow 12. The phase delays of any two consecutive radar pulse returns coming from the same scatterers in a plane 14, which is perpendicular to the velocity vector 12, will be equal. However, if the range vector 16 to the scatterers, from a radar pattern 17, is directed ahead of the zero-doppler plane 14 by an angle $\theta$, indicated by numeral 18, then the phase delay of the second pulse return will be less than that of the first pulse return for scatterers forward of the zero doppler plane 14, while the reverse will prevail for scatterers behind the zero doppler plane 14. In effect, the target or scatterer has moved closer to or farther away from the antenna in every instance except when the scatterer is in the zero doppler plane. Thus, in effect, if the physical antenna radar pattern 17 is pointed forward of the zero-doppler plane 14, and if the phase delay of the second of two consecutive pulse returns from the scatterers at a given range is subtracted from the phase delay of first pulse return from the same scatterers, the resulting phase difference will be positive. Conversely, if the physical antenna radar pattern were pointed behind the zero-doppler plane 14, the phase difference would be negative. When more than one scatterer is in the radar beam simultaneously, the pulse-to-pulse phase shift of the radar return signal is the pulse-to-pulse phase shift of the vector sum of the individual returns. This will, on the average, be equal to the pulse-to-pulse phase shift of the scatterers on the antenna pattern centerline. Therefore, an error signal can be generated over a time interval that is, on the average, a monotone function of this phase difference, and such a signal can be used in a null-seeking device to center the physical antenna beam with respect to the zero-doppler direction.

Further, in practice, the flight path may not be straight, i.e., the direction of the velocity vector 12, may vary. This situation is diagrammed in FIG. 1-B in which:

10 is a side-looking radar 12 is the direction of the velocity vector when the radar is at position X on the flight path 50.

12' is the direction of the velocity vector when the radar is at position Y on the flight path 50

14 is the zero doppler plane when the radar is at position X

14' is the zero doppler plane when the radar is at position Y.

16 is the range vector to the scatterer 17 is the physical antenna pattern 18 is the angle between the range vector to the scatterers and the zero doppler plane when the radar is at position X 18' is the angle between the range vector to the scatterers and the zero doppler plane when the radar is at position Y.

51 is the average flight path 50 is the actual flight path.

The physical antenna pattern is assumed to be pointed at a constant angle with respect to the average flight path 51. As the radar proceeds on the actual flight path 50 from position X to position Y, the direction of the velocity vector changes from 12 to 12'. Hence, the orientation of the zero doppler plane 14' is different from that of 14, and results in a change in the angle between the range vector to the scatterers and the zero doppler plane from 18 to 18'. As explained previously, the clutterlock generates a signal whose average value is a monotone function of this angle. This signal can be used to phase shift the radar return signals, creating an apparent zero doppler plane that coincides with the center line of the antenna pattern. This has the effect of straightening the flight path.

Alternately, it is possible to apply the clutterlock signals to steer the antenna beam so its direction coincides to the instantaneous orientation of the zero doppler plane. This is illustrated in FIG. 1-C, in which the numbers have the same meaning as in FIG. 1-B.

However, the above description is much over simplified because it assumes that the clutterlock signal has a constant value of zero for no angular deviation, when in fact the actual signal varies radically around an average value of zero. One source of this error is the fact that much of the time the radar energy returned from the forward side of the physical antenna pattern does not equal that from the after side. Also, even if the return signal energy is assumed uniform across the antenna pattern, deviations are produced by phase scintillation between the individual radar scatterers.

In the past this has been studied extensively both experimentally and analytically wherein a mathematical expression of the error signal was derived from basic considerations as a function of antenna azimuth position, the ratio of the radiated beam width to the angle between the zero-doppler plane and the first doppler ambiguous lobe, including a parameter denoting degree of terrain roughness. Using these statistical considerations, estimates were obtained for the mean and standard deviation of the error signal. It was found that the mean error signal became a function of antenna azimuthal position and depended upon various degrees of terrain roughness. However, because of differences in terrain roughness, if the error signal generated from two consecutive pulse returns is used in a null-seeking device to position an antenna, the position of the antenna will fluctuate about the zero-doppler plane due to fluctuations in the error signal. Thus, it was found that the value for the standard deviation of the antenna fluctuation could be reduced if the error signal was generated from different ranges and averaged, with the resulting average integrated over time to obtain many statistically independent extimates or "looks" at the error signal. It was found that the standard deviation of the resulting averaged error signal varied inversely as the square root of the effective number of independent looks achieved. But, because of the averaging the operation of the system is necessarily slow, and will not respond to short term aircraft error motions.

Thus, it is possible to reduce the fluctuating components of the error signal to any desired value provided there are enough range increments and the integration time (averaging time) is long enough. Clutterlock systems have been built and successfully operated that incorporate these features. For example, see the report of L. R. Blair on the AN/APS-37 (XH-2) to the 7th Annual Project Michigan on Battlefield Surveillance.

There is a problem, however, when the flight path deviations produce error signals with components of a shorter time duration than the averaging (or integration) time of the clutterlock. The conventional clutterlock cannot correct these signals and a new method is needed.

CLUTTERLOCK WITH DISPLACED PHASE ANTENNA

Therefore, in order to overcome the time element, a means was needed to generate the error signal so that the signal was not effected by increasing terrain roughness, or interference between the returns from individual scatterers, so that the antenna could be accurately positioned with a substantially lessening in the time required to determine a correct error signal.

Figure 2:
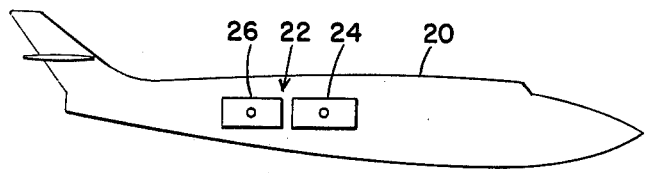
FIG. 2 is a side elevational view of an aircraft incorporating a preferred embodiment of the side by side antennas of the invention.
Figure 3:
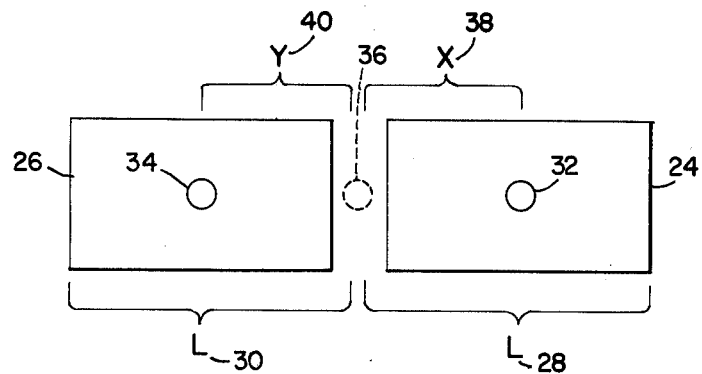
FIG. 3 is an enlarged view of the antennas of FIG. 2 illustrating their relationship and the distances therebetween.

The answer to the above problem is solved by using a compound antenna. For a proper understanding of the important aspects of the invention reference should be had to FIG. 2, wherein an aircraft 20 mounts a radar antenna complex, indicated generally by numeral 22 which is made up of two identical antennas 24 and 26, respectively, mounted in aligned substantially end-to-end relationship and facing substantially normal to the flight path of the aircraft 20. FIG. 3 is an enlarged view of the antennas alone which shows that the length of the antenna 24 is substantially L, indicated by numeral 28, while the length of antenna 26 is also L, indicated by numeral 30. Each antenna has a transmitting and receiving center, 32 and 34, respectively, substantially centrally positioned on the antenna. Of course, the centers 32 and 34 need not be centrally positioned on the antennas if different radiating patterns are desired. But, it is important that both centers be similarly positioned on their respective antennas. Therefore, it is seen that the total length of the antennas is approximately 2L and the distance between the centers 32 and 34 is approximately L in the direction of the flight path. It is because of this relationship that when the two antennas 24 and 26 transmit or receive together and in phase, the complex may be considered as a single equivalent antenna of length 2L with a center indicated by the imaginary dotted line 36.

The relationship between the imaginary center 36 and the actual centers 32 and 34 results in equal distance spacings denoted by lengths X and Y, indicated by numerals 38 and 40, respectively. For the purposes of the discussion hereinafter, it will be considered that both antennas 24 and 26 transmit together and in phase thereby creating a transmission phase center at the imaginary point 36. Receptions will be by each antenna separately at the reception phase centers 32 and 34. Any suitable means to achieve such transmission and reception will meet the needs of the invention. This physical set up allows the antenna complex to achieve the same functions as that described above with reference to the basic problem except that the problem of complex scatterers arising from terrain roughness or interference between the individual scatterers (scintillation) may be damped out by multiplying the return signals by the factor $(V/F - L/2 \div V/F$ where V equals the velocity along the flight path of the aircraft, F equals the pulse repetition frequency, and L has been described as the distance between the reception phase centers 32 and 34. A mathematical analysis of the return features of this physical antenna complex reveals that this feature is accomplished.

Figure 3A:
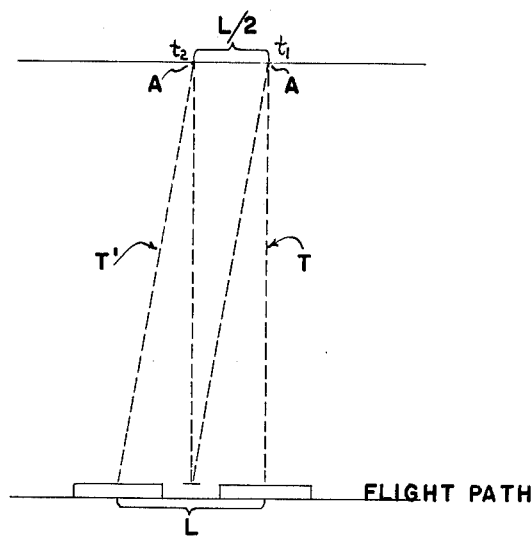

For a better understanding of how the complex scatterers are damped out see FIG. 3A which shows that a triangle T generated by a pulse to target A at time $t_1$ and detected by the forward reception center exactly equals a triangle T' generated by a pulse sent a distance L/2 later at time $t_2$ when target A has moved the distance L/2 and such pulse is received at the rearward reception center only when the flight path is parallel to the target A.

Figure 3B:
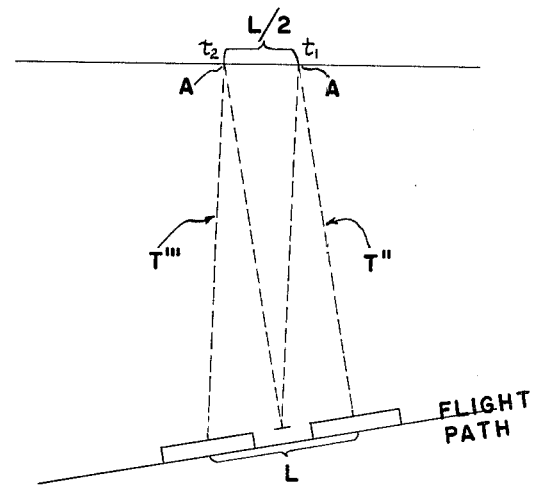

With such exact triangles T and T', if the former signal is time delayed the two will cancel each other and no error signal is produced to thereby indicate that the flight path is parallel to the antenna alignment. However, when the flight path takes a non-parallel relation to the antenna alignment, as shown in FIG. 3B, the triangles T'' and T''' are slightly different and thus when the former signal is time delayed and compared to the latter, an error is detected which can be appropriately interpreted to determine the amount and direction that the flight path has varied from the desired parallel relationship. The reason the phase shift exists is that there is a different range to the target at the beginning and end of the predetermined time interval. It should therefore be understood that the two antennas set up in combination with a properly coordinated delay comparision of return signals to the same target on the two reception centers achieves the improved objects of the invention. FIGS. 3A and 3B should be interpreted as being viewed by an observer situated with the antenna whereby the ground appears to move past the antenna.

The movement of the physical antenna radar pattern away from or toward the zero-doppler plane is determined by the along-the-beam-velocity which is proportional to the antenna deflection from the zero-doppler plane. Therefore, the error signal, which is utilized as a measure of antenna deflection from the condition of alignment with the zero-doppler plane, is also a measure of along-the-beam-velocity. It follows, therefore, that the error signal can either be used to position the antenna pattern along the zero-doppler plane or to alter the return signal phase to compensate for flight path errors.

Figure 4:
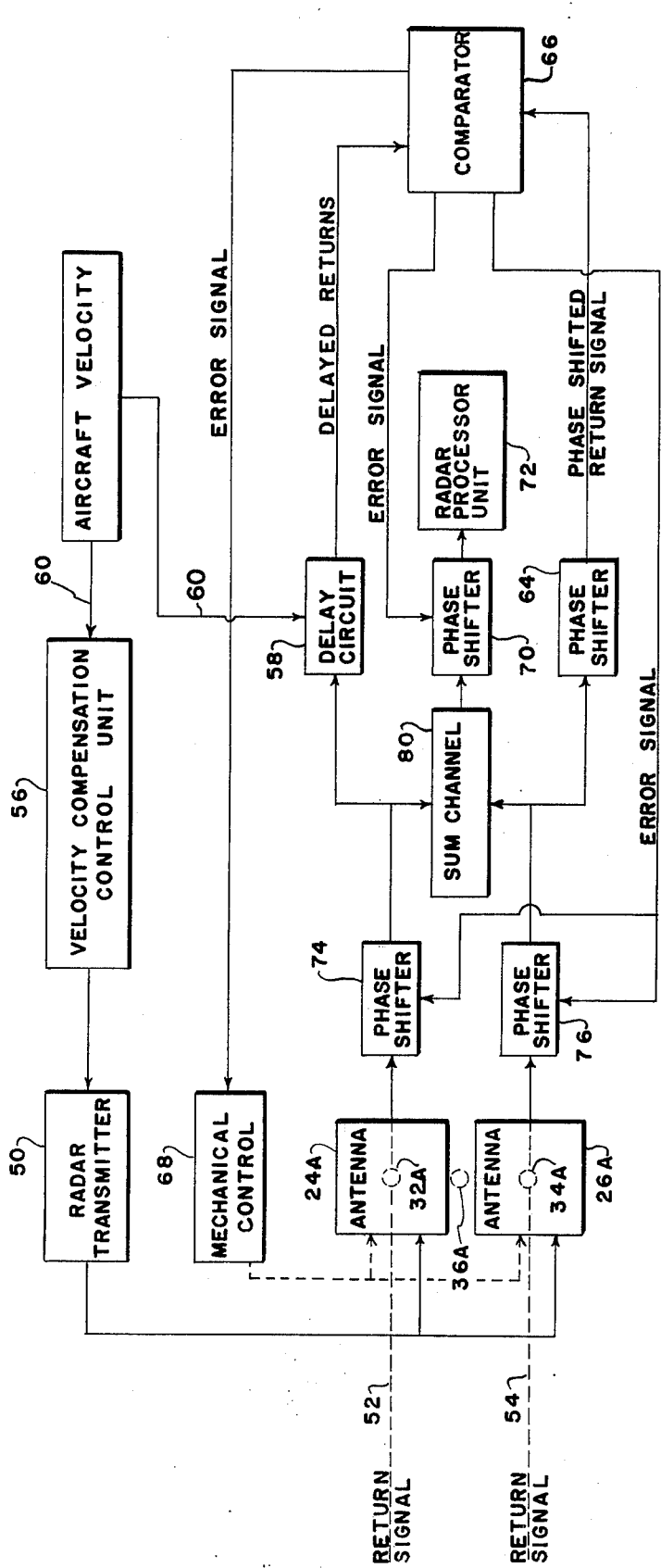
FIG. 4 is a schematic block diagram of a sample circuitry designed to achieve the objects of the invention.

For an understanding of how the clutterlock with displaced phase antenna actually operates, references should be had to FIG. 4, wherein a pair of antennas 24-A and 26-A are indicated in block diagram, but are considered to be mounted on a moving vehicle in substantially adjacent end-to-end relationship. A radar transmitter 50 is provided which is adapted to simultaneously pulse the antenna 24-A and 26-A in phase so that the hypothetical phase center for transmission 36-A is midway between the two antennas 24-A and 26-A.

A pair of return signals 52 and 54 are received at a pair of reception phase centers 32-A and 34-A, respectively. It should be repeated that the reception phase centers 32-A and 34-A are equally spaced forward and aft of the transmission phase center 36-A. An important feature of the invention is a velocity compensation control unit 56 which has aircraft velocity 60 as an input and is utilized to compensate for changes in vehicle velocity. Any well known unit to selectively control radar pulse repetition rate or frequency would meet the requirements of the unit 56. One simple method which may be utilized by unit 56 is to adjust the pulse repetition rate of the transmission pulses from the transmitter radar 50 so that the distance between the transmission phase center 36-A and each of the reception phase centers 32-A and 34-A is a whole number times the distance of aircraft travel between transmissions. In other words, the path of the electro-magnetic energy from the transmission phase center 36-A to any scatterer or collection of scatterers in the beam and back to the reception phase center 32-A, which is forward, is the same as the path from the transmission phase center 36-A to the same scatterer or collection of scatterers and back to the reception phase center 34-A, which is rearward, when the position of the aircraft 20 has moved the distance from the transmission phase center 36-A to the rearward reception phase center 34-A, which also is either the distance X or Y indicated by numeral 38 or 40 in FIG. 3. Thus, the exact physical relationship of the antennas and the transmission and reception phase centers is extremely important and critical to the operation of the system.

It is not necessary to vary the radar repetition frequency F with changes in vehicle velocity, V to meet the requirements of the velocity compensator unit 56 of FIG. 4. In practice, the distance L may be effectively varied electrically as a function of vehicle velocity. This is accomplished by vectorially adding and subtracting the return signals from the two antennas producing two new signals, a sum and a difference signal. The amplitude of the difference signal is changed by a factor $2V/FL$. Then this altered difference signal is vectorially added to the sum signal. The output is two signals that have very nearly the characteristics of signals received by antenna whose phase centers are spaced a distance $V/F$ ahead of and behind the imaginary pulse center 36-A. Thus, in this case, the velocity compensation control 56 controls the attenuation of the difference signal, not the pulse repetition frequency, F. A suitable unit to electrically displace the phase centers is shown in U.S. Pat. No. 3,064,254, and this type of circuitry may be incorporated into the unit 56 to achieve the objects of the invention.

Thus, the purpose of the velocity compensation control 56 is to make the distance flown by the aircraft between successive pulses of the radar equal one-half the distance between the reception phase centers. This can be done by (1) controlling the distance flown between radar pulse transmissions of which one method is to control the radar prf, or (2) controlling the distance between reception phase centers of which one synthetic method is the sum and difference scheme described above.

A second fundamental requirement is a method for delaying the signal from the forward antenna with respect to that from the rearward antenna a time equal to the time required by the airplane to fly one-half the distance between the apparent phase centers. This is indicated in block 58 of FIG. 4. For radar systems in which a variable time is required for the vehicle to move one-half the distance between phase centers, the delay must be variable with vehicle velocity 60 as an input. For radar systems in which the apparent separation of the phase centers is variable, the time delay may be constant.

A third fundamental requirement is a comparator (block 66), in which the delayed signals from antenna 24-A are phase compared with those from antenna 26-A. This phase comparison may be done by one of many methods. A common method is to insert 90° phase shift in one of the channels (block 64) and multiply the signals. This provides an output signal proportional to the sine of the phase difference between the signals received by the channels. This signal has sense inasmuch as the polarity reverses as the direction of the along-the-beam velocity reverses.

Another common method is to synchronously demodulate both channels with respect to a reference signal coherent with the transmitter. The in phase signal of one channel is then multiplied with the quadrature signal of the other channel. This also provides an error signal with sense. Naturally the comparator 66 must be provided with an input from the transmitter 50 in this situation, and also be properly logic orientated to perform the synchronous demodulation.

Still a third method is to substract the in-phase or quadrature synchronously demodulated signals to produce a bipolar error signal. Again the comparator 66 must be provided with appropriate logic circuitry to meet these requirements.

Assume any of the above described phase comparators, the resulting output signal is zero when the antenna is exactly aligned along the flight path. However, if an error signal is generated, it will energize mechanical control 68 to properly position the antennas 24-A and 26-A, which normally are physically a single unit to the properly aligned position with the flight path of the aircraft. Alternatively, the error signals may be sent to a phase shifter 70 to correct the phase of the signals to synthetically cause the flight path of the aircraft to be parallel to the antenna. These corrected signals are subsequently introduced into a standard radar processor unit 72 where they are used to provide the high azimuth resolution desired and achieved by the apparatus of the invention.

Because the actual operation of this system determines errors between each scatterer separately, there is no scintillation of complex scatterers, nor is there an error due to uneven distribution of scatterers. This is a highly important feature as time and energy requirements are substantially reduced and system accuracy is increased.

The invention contemplates that both the antennas 24 and 26 may be mounted as an integral unit, and non independently, so that the entire antenna is moved out of alignment with the flight path when the aircraft yaws during flight. This movement generates an error signal from the comparator 66 through comparison of the delayed return signal from the forward reception phase center 32A with the phase shifted return signal from the rearward reception phase center 34A. The error signal may be made to physically re-orientate the antenna, or else it may be made to electrically re-orientate the antenna by means of phase shifters 74 and 76 located in the return signal lines of antennas 24-A and 26-A. Alternatively, the error signal may be used to control the phase shift or time delay of the return signals so there is no pulse to pulse phase shift. This may be accomplished by adding the return signals together in a summing channel 80, with this summed signal then sent to the phase shifter 70 and radar processor unit 72. Note that FIG. 4 shows three error signal outputs from comparator 66. Only one of these outputs is used at any one time, and any convenient means within the comparator 66 may be used to make the selection of the mode of operation.

While in accordance with the Patent Statutes, only one best known embodiment of the invention has been illustrated and described in detail, it is to be particularly understood that the invention is not limited thereto or thereby, but that the invention scope is defined in the appended claims.

What is claimed is:

1. In an apparatus to properly align a coherent doppler-synthetic aperture radar along the flight path of an aircraft the combination of a pair of antennas operatively mounted as an integral unit to said aircraft in substantially longitudinal alignment with said aircraft in substantially adjacent end-to-end relationship whereby signals transmitted simultaneously from both antennas are in phase so that the transmissions appear as a single signal emanating from a phase center for transmission which is approximately halfway between the two antennas, and whereby said return signals are received separately by the antennas to define two phase centers for reception, one forward and one rearward in relation to the flight vector of the aircraft at equally spaced distances from said phase center for transmission, means to control the relationship between transmission frequency and the effective distance between the phase center for transmission and each of the phase centers for reception so that this distance is a whole number times the distance of the aircraft travel between transmissions, means to delay the return signals from the forward phase center for reception the time required for the aircraft to move the distance from a phase center for reception to the phase center for transmission multiplied approximately by the return signals from the rearward phase center, means to effect an approximately 90° phase shift between the delayed return signal from the forward phase center for reception and the return signal from the rearward phase center for reception, means to determine an error signal if the resultant phase shifted return signals from the phase centers for reception do not effect cancellation, and means to control the phase shift of the radar return signals with the error signals thus determined so the return signals will cancel indicating antenna alignment with the flight path.

2. In an apparatus to properly align a coherent doppler-synthetic aperture radar along the flight path of an aircraft the combination of a pair of antennas operatively mounted as an integral unit to said aircraft in substantially longitudinal alignment with said aircraft in substantially adjacent end-to-end relationship whereby signals transmitted simultaneously from both antennas are in phase so that the transmissions appear as a single signal emanating from a phase center for transmission which is approximately halfway between the two antennas, and whereby said return signals are received separately by the antennas to define two phase centers for reception, one forward and one rearward in relation to the flight vector of the aircraft at equally spaced distances from said phase center for transmission, means to control the relationship between transmission frequency and the effective distance between the phase center for transmission and each of the phase centers for reception so that this distance is a whole number times the distance of the aircraft travel between transmissions, means to delay the return signals from the forward phase center for reception the time required for the aircraft to move the distance from a phase center for reception to the phase center for transmission multiplied approximately by the return signals from the rearward phase center, means to effect an approximately 90° phase shift between the delayed return signal from the forward phase center for reception and the return signal from the rearward phase center for reception, means to determine an error signal if the resultant phase shifted return signals from the phase centers for reception do not effect cancellation, and means to adjust the longitudinal alignment of the antennas in accordance with the error signal to attain coincident alignment of the antennas with the flight path of the aircraft.

3. In an apparatus to align a coherent doppler-synthetic aperture radar with the flight path of an aircraft the combination of an antenna operatively mounted to said aircraft substantially in longitudinal alignment with the flight path of said aircraft, said antenna being adapted to transmit pulses from said antenna so that the pulses appear to emanate from a transmission phase center approximately centrally located on the antenna, said antenna also being adapted to separately receive reflections of said transmitted pulses at reception phase centers located on said antennae at equally spaced distances forward and rearward of said transmission phase center, means to control the relationship between transmission frequency and the effective distance between the transmission phase center and each of the reception phase centers so that this distance is a whole number times the distance of the aircraft travel between transmissions, means to delay the return signals from the forward reception phase center the time required for the aircraft to move the distance from a reception phase center to a transmission phase center multiplied approximately by the return signals from the rearward phase center, means to effect a partial phase shift between the delayed return signal from the forward reception phase center and the return signal from the rearward reception phase center, and means to determine an error signal if the resultant phase shifted return signals from the reception phase centers do not cancel.

4. In a system for orienting a coherent doppler radar respect to the flight path of an aircraft the combination of an antenna operatively mounted to said aircraft and substantially aligned parallel to the flight path thereof, said antenna being adapted to transmit pulses from said antenna so that the pulses appear to emanate from a transmission phase center approximately centrally located on the antenna, said antenna also being adapted to separately receive reflections of said transmitted pulses at reception phase centers located on said antenna at equally spaced distances forward and rearward of said transmission phase center.

means to compare reflections from the same surface received at the reception phase centers of the antenna by delaying the reflection received at the forward area the time required for aircraft movement a distance equal to one-half the spacing between the forward area and the rearward area and phase comparing it with the signal received at the rearward area to generate an error signal, and means to electrically reorientate the antenna in accordance with the air signal to attain coincident alignment of the antenna with the flight path of the aircraft.

5. In a system for orientating a coherent doppler radar with respect to the flight path of an aircraft the combination of an antenna operatively mounted to said aircraft in substantial alignment parallel to the flight path thereof, said antenna being adapted to transmit pulses from said antenna so that the pulses appear to emanate from a transmission phase center approximately centrally located on the antenna, said antenna also being adapted to separately receive reflections of said transmitted pulses at reception phase centers located on said antenna at equally spaced distances forward and rearward of said transmission phase center, means to control the relationship between transmission frequency of the radar pulses, the distance of aircraft travel between transmissions, and the distance between the reception phase centers on the antenna, means to compare reflections from the same surface received at the reception phase centers by delaying the reflection received at the forward area to compensate for the distance between the forward and rearward areas and phase comparing with the signal received at the rearward area to generate an error signal, and means to electrically re-orientate alignment of the antenna in accordance with the air signal to adjust the alignment of the antenna in accordance with the flight path of the aircraft.

6. In a system for orientating a coherent doppler radar with respect to the flight path of an aircraft the combination of an antenna operatively mounted to said aircraft and substantially aligned parallel to the flight path thereof, said antenna being adapted to transmit pulses from said antenna so that the pulses appear to emanate from a transmission phase center approximately centrally located on the antenna, said antenna also being adapted to separately receive reflections of said transmitted pulses at reception phase centers located on said antenna at substantially equally spaced distances forward and rearward of said transmission phase center, means to compare reflections from the same surface received at the reception phase centers by delaying the reflection received at the forward area to compensate for the spaced distance between the forward and rearward areas, and phase comparing with the signal received at the rearward area to generate an error signal, and means to adjust the longitudinal alignment of the antenna in accordance with the error signal to compensate or errors caused by deviations in the flight path of the aircraft.

* * * * *